United States Patent [19]

Johnson et al.

[11] 4,113,927

[45] Sep. 12, 1978

[54] BATTERY SEPARATOR HAVING COATED RIBS

[75] Inventors: Peter E. Johnson; Bob G. Rowland, both of Corvallis, Oreg.

[73] Assignee: Evans Products Company, Portland, Oreg.

[21] Appl. No.: 604,350

[22] Filed: Aug. 13, 1975

[51] Int. Cl.² ............................................. H01M 2/18
[52] U.S. Cl. .................................... 429/143; 429/146
[58] Field of Search ................ 136/145; 429/143, 146

[56] References Cited

U.S. PATENT DOCUMENTS

| 2,687,445 | 8/1954 | Merrill | 136/145 |
| 3,228,803 | 1/1966 | Little | 136/145 |
| 3,450,571 | 6/1969 | Zenczak | 136/145 |
| 3,556,851 | 1/1971 | Douglas et al. | 136/145 |
| 3,890,184 | 6/1975 | Morgan | 136/145 |

*Primary Examiner*—Donald L. Walton
*Attorney, Agent, or Firm*—Robert E. Howard

[57] ABSTRACT

A battery separator having ribs on at least one side thereof and formed of a sintered resin, the rib tops having a coating thereon consisting of a low-density polyethylene wax.

8 Claims, No Drawings

BATTERY SEPARATOR HAVING COATED RIBS

BACKGROUND OF THE INVENTION

The manufacture of battery separators from a sintered resin is well established in the art. One method of making such separators is disclosed and described in U.S. Pat. No. 3,450,571.

Briefly, such processes involve depositing a powdered heat-fusible resin material such as polyvinyl chloride, polyethylene, polypropylene or similar polymers, copolymers or mixtures thereof onto a conveyor, passing the powdered material through a forming die to form ribs thereon, passing the material through a sintering oven to fuse the resin material into a porous web, and cutting the porous web into battery separators.

Such separators have been commercially successful for a number of years. Recently, however, battery manufacturers have commenced employing a new process for manufacturing dry charge batteries which has lead to some problems with these types of sintered separators. Briefly, this problem arises due to the practice of the battery manufacturers to fill a newly manufactured battery with battery acid, and then removing the battery acid without drying. Such a process leaves the separator and plates in a damp condition which permits current to flow between the plates, thereby self-discharging the battery. In addition, when the pH in the battery reaches about 5-6, certain lead compounds that are formed become soluble and the grids corrode, causing the plates to rapidly deteriorate.

SUMMARY OF THE INVENTION

It has been discovered that the aforementioned problem associated with batteries containing sintered resin-type separators can be corrected by coating the top of the ribs of the separator with a low-density polyethylene wax. The polyethylene wax should have a softening point higher than about 70° C. and preferably higher than about 120° C.

DESCRIPTION OF THE PREFERRED EMBODIMENTS

The battery separators of the present invention may be manufactured by any of those prior processes involving sintering of a resinous material, such as that process described in aforementioned U.S. Pat. No. 3,450,571.

Immediately after the sintering oven, the rib tops of the sintered resin separator are coated with a coating material consisting essentially of a low-density polyethylene wax.

It has been found that the self-discharging problem can be overcome if a coating is applied to the rib tops that is non-reactive with both the separator and plates, is not dissolved by the battery acid, and is able to saturate and adhere to the rib tops without flowing onto the body of the separator during battery manufacture, where temperatures may rise to between about 150° to 250° F. (65.5° to 121° C.). It has been found that certain low-density polyethylene waxes fulfill these requirements.

Low-density polyethylene waxes suitable for use in the present invention include those homopolymers of polyethylene having a density between about 0.91 to 0.96, a molecular weight in the range of between about 2000 to about 4000, a softening point (ring and ball method) between about 70° C. and 130° C., preferably between about 120° C. and 130° C. and a needle penetration at 25° C. (ASTM D-1321) of less than about 10 and preferably less than about 1 mm.

The coating may be applied by any conventional hot-melt coater. One suitable coater is Model 22D manufactured by Black Brothers. In such a device, the polyethylene wax is melted in the nip formed by two steam heated, chromed steel rolls which have end dams at each end of the nip formed therebetween. One of the rolls constitutes the application roll and the other constitutes a doctor roll. The application roll contacts the tops of the ribs of a battery separator web passing through the nip formed by the heated application roll and a back-up roll. The apparatus employed for carrying out this coating operation is not critical, and any means which can apply the coating material to the rib tops of the battery separators, either before the separator material is cut into its final shape or prior thereto, may be employed in forming the battery separators of the present invention.

The coating thickness is preferably between about 1 and about 10 mils, and most preferably between about 2 and about 4 mils.

The following example illustrates a specific embodiment of the present invention, but is not to be construed as limiting the scope of the patent thereto.

EXAMPLE 1

A continuous web of sintered polyvinyl chloride having ribs on one side thereof, the ribs being 0.05 inches high, 0.04 inches wide and spaced 0.5 inches apart, was formed by the process described in U.S. Pat. No. 3,450,571. After leaving the sintering oven, the web is passed through a nip formed between a chromed steel, steam heated application roll and a back-up roll, the rib tops being contacted by the chromed steel application roll. The chromed steel application roll formed a nip with a steam heated chromed steel doctor roll, the ends of the nip between the doctor roll and the application roll being dammed to form a reservoir therebetween. The reservoir contained a coating material consisting of a low-density polyethylene wax sold under the Trademark 2000 Polywax manufactured by the Bareco division of Petrolite Corporation. Bareco 2000 Polywax has a molecular weight of 2000, a softening point of 257° F. (125° C.) and a needle penetration at 25° C of 0.5 mm. The spacing between the doctor roll and the application roll was adjusted to provide a coating of between 2 and 4 mils of the coating material on the rib tops. The temperature in the nip was approximately 270° F. The roll coater employed is manufactured by Black Brothers, Model 22D. The web was subsequently cut to a standard battery separator size of 5 9/16 by 5 13/16 inches. Separators having coated ribs manufactured according to this example and ones identical thereto except not containing a coating on the rib tops thereof were tested by a modified AABM 1962 Electrical Resistance Test in which only a single rib is exposed to the electrolyte and the current passing therethrough. The results were as follows:

| Separator Type | Rib Resistance (ohms) |
| --- | --- |
| 1. Coated | 0.89-0.96 |
| 2. Uncoated | 0.26-0.39 |

The foregoing results show that separators having ribs coated in accordance with the example had a significantly higher resistance than uncoated separators.

EXAMPLE 2

Batteries were constructed with separators made in accordance with foregoing example 1 and tested for dry discharge rates by short circuiting the battery across a 30 milliohm shunt. The results, compared to identical batteries constructed from identical separators but without a coating on the ribs were as follows:

| Separator Type | Discharge (Amps) |
|---|---|
| 1. Coated | 0.47–0.93 |
| 2. Uncoated | 2–2.5 |

The foregoing results show that batteries employing the separators of the present invention have a significantly lower discharge rate than batteries manufactured from uncoated separators.

We claim:

1. In a battery separator manufactured by sintering a heat-fusible resin and having ribs on at least one side thereof, the improvement comprising a coating on said ribs, said coating consisting essentially of a low-density polyethylene wax having a softening point between about 70° C. and about 130° C.

2. The separator of claim 1 wherein the softening point is between about 120° C. and about 130° C.

3. The separator of claim 1 wherein the coating has a thickness between about 1 and about 10 mils.

4. The separator of claim 3 wherein the coating thickness is between about 2 and about 4 mils.

5. The separator of claim 1 wherein the heat-fusible resin is selected from the group consisting of polyvinyl chloride, polyethylene, polypropylene and mixtures thereof.

6. The separator of claim 5 wherein the resin is polyvinyl chloride.

7. In a battery separator formed of a sintered heat-fusible resin selected from the group consisting of polyvinyl chloride, polyethylene, polypropylene and mixtures thereof, and having ribs on at least one surface thereof, the improvement comprising a coating on said ribs having a thickness between about 1 and about 10 mils, said coating consisting essentially of a low-density polyethylene wax having a molecular weight between about 2,000 and 4,000, a softening point between about 70° C. and about 130° C., and a needle penetration of less than about 10 mm.

8. The separator of claim 7 wherein said low-density polyethylene wax has a softening point between about 120° C. and about 130° C. and a needle penetration of less than about 1 mm.

* * * * *